United States Patent [19]

Mink et al.

[11] Patent Number: 5,397,757

[45] Date of Patent: Mar. 14, 1995

[54] NEW COCATALYSTS FOR METALLOCENE-BASED OLEFIN POLYMERIZATION CATALYST SYSTEMS

[75] Inventors: Robert I. Mink, Warren; Yury V. Kissin, East Brunswick, both of N.J.

[73] Assignee: Mobile Oil Corporation, Fairfax, Va.

[21] Appl. No.: 141,759

[22] Filed: Oct. 27, 1993

[51] Int. Cl.⁶ .............................................. B01J 31/00
[52] U.S. Cl. ................................. 502/115; 502/104; 502/117
[58] Field of Search .................... 502/104, 115, 117

[56] References Cited

U.S. PATENT DOCUMENTS

| | | | |
|---|---|---|---|
| 4,404,344 | 9/1983 | Sinn et al. | 526/160 |
| 4,542,199 | 9/1985 | Kaminsky et al. | 526/160 |
| 5,077,255 | 12/1991 | Welborn, Jr. | 502/104 |
| 5,086,135 | 2/1992 | Kissin | 526/151 |
| 5,106,804 | 4/1992 | Bailly et al. | 502/104 |
| 5,122,491 | 6/1992 | Kioka et al. | 502/103 |
| 5,126,301 | 6/1992 | Tsutsui et al. | 502/115 |

OTHER PUBLICATIONS

H. Sinn and W. Kaminsky, "Ziegler–Natta Catalysis", Adv. Organomet. Chem., vol. 18, 99–149.

*Primary Examiner*—Helen M. S. Sneed
*Assistant Examiner*—E. D. Irzinski
*Attorney, Agent, or Firm*—Alexander J. McKillop; Malcolm D. Keen; Marina V. Schneller

[57] ABSTRACT

The invention relates to a catalyst composition for ethylene polymerization which comprises (1) a metallocene complex, (2) carbon tetrachloride or carbon tetrabromide, (3) an organomagnesium compound, (4) trimethylaluminum.

31 Claims, No Drawings

NEW COCATALYSTS FOR METALLOCENE-BASED OLEFIN POLYMERIZATION CATALYST SYSTEMS

FIELD OF THE INVENTION

The invention relates to improved catalysts and to modifications and improvements in polymerization and copolymerization of ethylene, undertaken in the presence of catalyst systems comprising metallocenes of transition metals. The invention relates to metallocene catalysts which do not require aluminoxane to activate the catalysts or aluminoxane cofeed to the polymerizaton reactor.

BACKGROUND OF THE INVENTION

Metallocene compounds of transition metals are used as catalyst precursors for polymerization and copolymerization of ethylene. Metallocenes can be described by the empirical formula $Cp_mMA_nB_p$. These compounds in combination with an aluminoxane such as methylalumoxane (MAO) have been used to produce olefin polymers and copolymers, such as ethylene and propylene homopolymers, ethylene-butene and ethylene-hexene copolymers, e.g., see Kaminsky et. al., U.S. Pat. No. 4,542,199 and Sinn et. al., U.S. Pat. No. 4,404,344.

Methylalumoxane is used as a co-catalyst with metallocene catalysts. It comprises mixtures of oligomeric linear and/or cyclic alkylaluinoxanes with an average molecular weight of about 1200 represented by the formulas:

R—(Al(R)—O)$_n$—AlR$_2$ for linear aluminoxanes and
(—Al(R)—O—)$_m$ for cyclic aluminoxanes wherein n is 1–40, preferably 10–20, m is 3–40, preferably 3–20 and R is preferably methyl.

Use of MAO has presented problems in the development of catalysts formed from metallocenes. Because of the varying chemical makeup of the material itself, as reflected by its formula above, it is often difficult to obtain reproducable catalyst synthesis results. If supported catalysts are prepared with combinations of metallocenes and MAO, MAO is not uniformly distributed within catalyst particles. The resulting non-homogeneous polymerization catalysts have low activity and produce resins with poor properties.

SUMMARY OF THE INVENTION

The invention provides an activator or cocatalyst for metallocenes which requires no aluminoxanes in the synthesis or in the reactor.

The invention relates to an activated catalyst composition which comprises
(1) metallocene,
(2) carbon tetrachloride or carbon tetrabromide,
(3) an organomagnesium compound,
(4) trimethylaluminum,
wherein the organomagnesium compound is used in an amount sufficient to provide an organomagnesium compound:metallocene molar ratio of 10 to 500,
wherein trimethylaluminum is used in an amount sufficient to provide a trimethylaluminum:metallocene molar ratio of 50 to 1000,
wherein said carbon tetrachloride or carbon tetrabromide, is present in an amount to provide a molar ratio with the organomagnesium compound which ranges from 0.5 to 5.

The invention includes the catalysts described herein, polymerizations and copolymerizations achieved thereby, and the product(s) thereof.

DETAILED DESCRIPTION OF THE INVENTION

Catalyst Composition

The catalyst may be unsupported or supported, and comprises
(1) metallocene,
(2) carbon tetrachloride or carbon tetrabromide,
(3) an organomagnesium compound,
(4) trimethylaluminum,
wherein the organomagnesium compound is used in an amount sufficient to provide an organomagnesium compound:metallocene molar ratio of 10 to 500,
wherein trimethylaluminum is used in an amount sufficient to provide a trimethylaluminum:metallocene molar ratio of 50 to 1000,
wherein said carbon tetrachloride or carbon tetrabromide, is present in an amount to provide a molar ratio with the organomagnesium compound which ranges from 0.5 to 5. The combination of carbon tetrachloride or carbon tetrabromide, an organomagnesium compound and trimethylaluminum can be viewed as a ternary cocatalyst for the metallocene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen atom or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by alkyl groups such as —$CH_2$—, —$CH_2$—$CH_2$—, —$CR'R''$— and —$CR'R''$—$CR'R''$— where R' and R" are short alkyl groups or a hydrogen atom, or dialkysilane groups such as —$Si(CH_3)_2$—, —$Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)]zirconium dichloride. The metallocene compounds utilized within the embodiment of this art can be used as crystalline solids, as solutions in aromatic hydrocarbons or in a supported form.

If the metallocene is supported, the support carrier material is a particulate, porous, solid such as an oxide of silicon and/or of aluminum, or a crosslinked polymer of, e.g. polystyrene. Preferably, it is an inorganic material. The carrier material is used in the form of a dry powder having an average particle size of from about 1 micron to about 250 microns, preferably from about 10 microns to about 150 microns. The surface area of the carrier is at least about 3 square meters per gram ($m^2$/gm), and preferably at least about 50 $m^2$/gm up to about 350 $m^2$/gm. The carrier material should be dry, that is, free of absorbed water. Drying of the inorganic carrier material can be effected by heating at about 100° C. to about 1000° C., preferably at about 600° C. When the carrier is silica, it is heated to at least 200° C., preferably about 200° C. to about 850° C. and most preferably at about 600° C.

In the most preferred embodiment, the carrier is silica which, prior to the use thereof in the first catalyst synthesis step, has been dehydrated by fluidizing it with nitrogen or air and heating at about 600° C. for about 4 to 16 hours to achieve a surface hydroxyl group concentration of about 0.7 millimoles per gram (mmols/gm). The silica of the most preferred embodiment is a high surface area, amorphous silica (surface area=300 $m^2$/gm; pore volume of 1.65 $cm^3$/gm), and it is a material marketed under the tradenames of Davison 952 or Davison 955 by the Davison Chemical Division of W. R. Grace and Company. The silica is in the form of spherical particles, e.g., as obtained by a spray-drying process.

In one embodiment of a supported catalyst of the invention, the metallocene is supported on the carrier and then the remaining components of the catalyst are added thereto. The order of addition of the remaining components does not appear to be critical. Support of the metallocene on the carrier is undertaken by dissolving the metallocene in a polar solvent (under anhydrous conditions), slurrying the carrier in the polar solvent containing the metallocene in order to impregnate the carrier with the metallocene, and removing the polar solvent to recover a dry particulate supported metallocene. Slurrying and contact of the metallocene with the support is undertaken at temperatures ranging from 20° to 60° C., preferably 30° to 55° C. Solvent removal, after the impregnation, is undertaken at a temperature up to 60° C., with or without a nitrogen purge. The polar solvent in this step may be an aromatic or chlorinated hydrocarbon, an ether, a cyclic ether, an ester, or a ketone. The preferred solvent is tetrahydrofuran. The loading of the metallocene on the support is in the range of 0.1 to 1.0 grams per gram of support, preferably 0.25 to 0.45 grams per gram of support. For activation, the supported metallocene, as a free flowing powder, is then contacted with the carbon tetrachloride or carbon tetrabromide, an organomagnesium compound and trimethylaluminum.

The organomagnesium compound has the empirical formula

where and R' are the same or different $C_2$-$C_{12}$ alkyl groups, preferably $C_4$-$C_{10}$ alkyl groups and n is 0 or 1, providing that m+n is equal to the valence of Mg. By way of example, each of R and R' may be ethyl, butyl and hexyl; the compounds can be ethylbutylmagnesium; dihexylmagnesium or dibutylmagnesium. More preferably, each of R and R' is $C_4$-$C_8$ alkyl groups, and most preferably both R and R' are butyl groups.

The amount of organomagnesium compound used in the catalyst composition provides an organomagnesium compound:metallocene molar ratio of 10 to 500, preferably 100 to 200.

The halogen-containing compound which is a part of the catalyst composition can be any of those selected from the group of perhalohydrocarbons. Carbon tetrachloride and carbon tetrabromide are preferred. The amount of the halogen-containing compound provides a halogen-containing compound:organomagnesium compound molar ratio of 0.5 to 5, preferably 1 to 3.

The third component of the system used to activate the metallocene is a trialkylaluminum free of aluminoxane. The alkyl groups in the trialkylaluminum can be of 1 to 6 carbon atoms. Trimethylaluminum (TMA) is the most preferred trialkylaluminum. The amount of the TMA in the activator is sufficient to give an Al:metallocene molar ratio of about 50 to about 1000, preferably about 100 to about 300.

The catalyst synthesis of the present invention is undertaken in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas.

The metallocene may be activated in situ by adding the ternary activator and metallocene (supported or unsupported) separately to the polymerization medium. It is also possible to combine the metallocene and the activator before the introduction thereof into the polymerization medium, e.g., for up to about 2 hours prior to the introduction thereof into the polymerization medium at a temperature of from about −40 to about 100° C.

Polymerization

Alpha-olefins are polymerized with the catalysts prepared according to the present invention by any suitable process. Such processes include polymerizations carried out in suspension, in solution or in the gas phase.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by measurable positive change in melt index ($I_2$) of the polymer produced.

The linear polyethylene polymers prepared in accordance with the present invention are homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. The most preferred comonomers are 1-Butene and 1-hexene.

The linear low density polyethylene polymers produced in accordance with the present invention preferably contain at least about 80 present by weight of ethylene units. The following examples further illustrate the essential features of the invention. However, it will be apparent to those skilled in the art that the specific reactants and reaction conditions used in the Examples do not limit the scope of the invention.

EXAMPLES

Example 1.

A. Preparation of supported catalyst precursor. 1.0 g of silica dehydrated at 600° C. was mixed with 0.292 g (1 mmol) of $(C_5H_5)_2ZrCl_2$ dissolved in 25 cc of dry tetrahydrofuran, and the solvent was removed under nitrogen purge at 50° C. for 2 hours.

B. Polymerization. 1.6-liter stainless steel reactor was filled with 750 cc of n-heptane and 150 cc of 1-hexene. The catalyst components were added to the autoclave in the following sequence: (a) 6.0 mmol of $Al(CH_3)_3$; (b) 6.0 mmol of $CCl_4$; (c) 3.0 mmol of $Mg(C_4H_9)_2$ in heptane, after which the autoclave was heated to 90° C.; (d) 0.0636 g of the supported catalyst precursor. Ethylene was admitted to the autoclave to maintain a total pressure of 206 psig. The polymerization reaction was carried out for 60 min to yield 31.8 g of ethylene-hexene copolymer containing 4.5 mol. % of hexene. The resin has an $I_2$ value of 55; it has two melting points at 114.5° and 123.8° C.

Example 2.

1.6-liter stainless steel reactor was filled with 750 cc of n-heptane and 150 cc of 1-hexene. The catalyst components were added to the autoclave in the following sequence: (a) 3.0 mmol of $Mg(C_4H_9)_2$ in heptane; (b) 3.0 mmol of $CCl_4$; (c) 6.0 mmol of $Al(CH_3)_3$, after which the autoclave was heated to 90° C.; (d) 0.0532 g of the supported catalyst precursor from Example 1. Ethylene was admitted to the autoclave to maintain a total pressure of 208 psig. The polymerization reaction was carried out for 60 min to yield 15.1 g of ethylene-hexene copolymer containing 5.9 mol.% of hexene. The resin has an 12 value of 57; it has two melting points at 114.6 and 123.8° C.

Example 3

Polymerization experiment was carried out under conditions of Example 2 except that $CBr_4$ in the amount of 4.5 mmol was used instead of $CCl_4$. The catalyst precursor of Example 1 was used in the amount of 0.049 g, and the polymer yield was 5.0 g.

Comparative Examples

Several experiments were carried out in which one of the components in the tertiary cocatalyst mixture was not added to the polymerization system. In all these examples, the remaining components of the cocatalyst failed to activate metallocene complexes.

What is claimed is:

1. A process for preparing supported alpha olefin polymerization catalyst compositions which comprises the steps of:
   (i) forming a catalyst precursor by providing silica which is porous and has a particle size of 1 to 200 microns, having pores which have an average diameter of 50 to 500 Angstroms and having a pore volume of 0.5 to 5.0 cc/g; and impregnating said silica with at least one metallocene compound of the formula: $Cp_mMA_nB_p$ wherein Cp is cyclopentadienyl unsubstituted or substituted by at least one substituent group comprising 1 to 6 carbon atoms, wherein said substituent group is selected from the group consisting of alkyl, alkylene and silane; m is 1 or 2; M is zirconium or hafnium; and each of A and B is selected from the group consisting of a halogen atom, a hydrogen atom and an alkyl group, providing that m+n+p is equal to the valence of M; and ii) combining the catalyst precursor of (i) with a combination of:

at least one organomagnesium compound having the formula $R_mMgR'_n$ where R and R' are the same or different $C_4$–$C_{12}$ alkyl groups, m and n are each 0, 1 or 2, provided that m+n is equal to the valence of Mg;

at least one halogen-containing compound selected from the group consisting of carbon tetrachloride and carbon tetrabromide; and trimethylaluminum, wherein the organomagnesium compound is used in an amount sufficient to provide an organomagnesium compound:metallocene molar ratio of 10 to 500, wherein trimethylaluminum is used in an amount sufficient to provide a trimethylaluminum:metallocene molar ratio of 50 to 1000, wherein said carbon tetrachloride or carbon tetrabromide, is present in an amount to provide a molar ratio with the organomagnesium compound which ranges from 0.5 to 5.

2. A process of claim 1 wherein R and R' are $C_4$–$C_{10}$ alkyl groups.

3. A process of claim 2 wherein R and R' are $C_4$–$C_8$ alkyl groups.

4. A process of claim 3 wherein R and R' are each butyl groups.

5. The process of claim 1, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium.

6. The process of claim 5, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)-zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,6-tetrahydro-1-indenyl)]zirconium dichloride.

7. Catalyst composition for producing ethylene polymers or copolymers comprising
   (1) a metallocene compound,
   (2) carbon tetrachloride or carbon tetrabromide,
   (3) an organomagnesium compound,
   (4) trimethylaluminum,
   wherein organomagnesium compound is used in an amount sufficient to provide an organomagnesium compound:metallocene molar ratio of 10 to 500,
   wherein trimethylaluminum is used in an amount sufficient to provide a trimethylaluminum:metallocene molar ratio of 50 to 1000,
   wherein said carbon tetrachloride or carbon tetrabromide, is present in an amount to provide a molar ratio with the organomagnesium compound which ranges from 0.5 to 5 wherein the metallocene compound has the formula: $Cp_mMA_nB_p$ wherein
   Cp is cyclopentadienyl unsubstituted or substituted by at least one substituent group comprising 1 to 6 carbon atoms, wherein said substituent group is selected from the group consisting of alkyl, alkylene and silane;
   m is 1 or 2;
   M is zirconium or hafnium; and each of A and B is selected from the group consisting of a halogen atom, a hydrogen atom and an alkyl group, providing that m+n+p is equal to the valence of M; and
   wherein the organomagnesium compound has the formula $R_mMgR'_n$ where R and R' are the same or different $C_4$-$C_{12}$ alkyl groups, m and n are each 0, 1 or 2, provided that m+n is equal to the valence of Mg.

8. The catalyst composition of claim 7, wherein each of the R and R' groups of said organomagnesium compound contain 4 to 8 carbon atoms.

9. The catalyst composition of claim 8, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)]zirconium dichloride.

10. The catalyst composition of claim 9, which includes carbon tetrachloride.

11. The catalyst composition of claim 9, which includes carbon tetrabromide.

12. A supported catalyst composition for producing ethylene polymers or copolymers comprising
    (1) a metallocene compound
    (2) carbon tetrachloride or carbon tetrabromide,
    (3) an organomagnesium compound,
    (4) trimethylaluminum,
    wherein organomagnesium compound is used in an amount sufficient to provide an organomagnesium compound:metallocene molar ratio of 10 to 500,
    wherein trimethylaluminum is used in an amount sufficient to provide a trimethylaluminum:metallocene molar ratio of 50 to =1000
    wherein said carbon tetrachloride or carbon tetrabromide, is present in an amount to provide a molar ratio with the organomagnesium compound which ranges from 0.5 to 5,
    wherein said metallocene compound is supported on silica, which is porous and has a particle size of 1 to 500 microns, having pores which have an average diameter of 50 to Angstroms and having a pore volume of 0.5 to 5.0 cc/g; wherein the metallocene compound has the formula: $Cp_mMA_nB_p$ wherein
    Cp is cyclopentadienyl unsubstituted or substituted by at least one substituent group comprising 1 to 6 carbon atoms, wherein said substituent group is selected from the group consisting of alkyl, alkylene and silane;
    m is 1 or 2;
    M is zirconium or hafnium; and each of A and B is selected from the group consisting of a halogen atom, a hydrogen atom and an alkyl group, providing that m+n+p is equal to the valence of wherein the organomagnesium compound has the formula M; and
    wherein the organomagnesium compound has the formula $R_mMgR'_n$ where R and R' are the same or different $C_4$-$C_{12}$ alkyl groups, m and n are each 0, 1 or 2, provided that m+n is equal to the valence of Mg.

13. The supported catalyst composition of claim 12, wherein the R groups of said organomagnesium compound contain four carbon atoms.

14. The supported catalyst composition of claim 13, wherein the metallocene compound is biscyclopentadienyl zirconium dichloride.

15. The supported catalyst composition of claim 14, which includes carbon tetrachloride.

16. The supported catalyst composition of claim 14, which includes carbon tetrabromide.

17. The process of claim 1 wherein the substituent group is straight-chain alkyl of 1 to 6 carbon atoms.

18. The process of claim 1, wherein the substituted Cp is selected from the group consisting of indenyl, tetrahydroindenyl, fluorenyl and partially hydrogenated fluorenyl.

19. The process of claim 1, wherein m=2 and the cyclopentadienyl groups are bridged by alkylene or dialkylsilane
    wherein alkylene is selected from the group consisting of —$CH_2$—, —$CH_2$—$CH_2$—, —CR'R'' and —CR'R''CR'R''—, wherein each of R' and R'' is hydrogen or alkyl.

20. The catalyst composition of claim 7, wherein the substituent group is straight-chain alkyl of 1 to 6 carbon atoms.

21. The catalyst composition of claim 7, wherein the substituted Cp is selected from the group consisting of indenyl, tetrahydroindenyl, fluorenyl and partially hydrogenated fluorenyl.

22. The catalyst composition of claim 7, wherein m=2 and the cyclopentadienyl groups are bridged by alkylene or dialkylsilane
    wherein alkylene is selected from the group consisting of —$CH_2$—, —$CH_2$—$CH_2$—, and —CR'R'' and —CR′R″CR′R″—, wherein each of R′ and R″ is hydrogen or alkyl.

23. The catalyst composition of claim 12, wherein the substituent group is straight-chain alkyl of 1 to 6 carbon atoms.

24. The catalyst composition of claim 12, wherein the substituted Cp is selected from the group consisting of indenyl, tetrahydroindenyl, fluorenyl and partially hydrogenated fluorenyl.

25. The catalyst composition of claim 12, wherein m=2 and the cyclopentadienyl groups are bridged by alkylene or dialkylsilane
   wherein alkylene is selected from the group consisting of —CH$_2$—, —CH$_2$—CH$_2$—m —CR′R″ and —CR′R″CR′R″—, wherein each of R′ and R″ is hydrogen or alkyl.

26. The process of claim 1, wherein Cp is monosubstituted cyclopentadienyl.

27. The process of claim 1, wherein Cp is polysubstituted cyclopentadienyl.

28. The catalyst composition of claim 7, wherein Cp is monosubstituted cyclopentadienyl.

29. The catalyst composition of claim 7, wherein Cp is polysubstituted cyclopentadienyl 30. The catalyst composition of claim 12, wherein Cp is monosubstituted cyclopentadienyl.

31. The catalyst composition of claim 12, wherein Cp is polysubstituted cyclopentadienyl.

* * * * *

UNITED STATES PATENT AND TRADEMARK OFFICE
CERTIFICATE OF CORRECTION

PATENT NO. : 5,397,757
DATED : March 14, 1995
INVENTOR(S) : Robert I. Mink et al.

It is certified that error appears in the above-indentified patent and that said Letters Patent is hereby corrected as shown below:

Title Page, Assignee, [73], "Mobile" should read --Mobil--.

Col. 7, line 5, after "cyclopentadienyl" insert -- hyphen (-)--.

Col. 7, line 55, after cyclopentadienyl" insert -- hyphen (-)--.

Col. 8, line 6, after "to" delete "=".

Col. 8, line 14, after "50 to" insert --500--.

Col. 8, line 27, after "valence" delete --wherein the organomagnesium compound has the formula--.

Col. 8, line 39, "biscyclopentadienyl zirconium" should read --biscyclopentadienylzirconium--.

Signed and Sealed this

Thirteenth Day of June, 1995

Attest:

BRUCE LEHMAN

*Attesting Officer*  *Commissioner of Patents and Trademarks*